July 13, 1965

H. E. LUEBKEMANN 3,193,976

MACHINE TOOL FEED SYSTEM

Filed July 23, 1962

INVENTOR.
HARRY E. LUEBKEMANN
BY
ATTORNEYS

WHEELHEAD MOVING IN ON SCREW. HANDWHEEL & SCREW 49 CCW. SHAFT 105 CW. DIAMETER READING DECREASING.

WHEELHEAD MOVING OUT ON SCREW. HANDWHEEL & SCREW 49 CW. SHAFT 105 CCW. DIAMETER READING INCREASING.

United States Patent Office 3,193,976
Patented July 13, 1965

3,193,976
MACHINE TOOL FEED SYSTEM
Harry E. Luebkemann, Cincinnati, Ohio, assignor to The Cincinnati Milling Machine Co., Cincinnati, Ohio, a corporation of Ohio
Filed July 23, 1962, Ser. No. 211,605
8 Claims. (Cl. 51—165)

The present invention relates to an improved machine tool feed system particularly suitable in a grinding machine for quick adjustment to grind accurately diameters of different size.

In some grinding operations, a single grind (or a relatively few grinds) at one diameter is followed by a grind at a different diameter. For example, in grinding a multi-diameter shaft, each grind must produce a different diameter than the previous grind. Usually, in grind operations of this type, the machine can be adjusted between grinds only after the operator has calculated the change in diameter required, and converted this data into the angular rotation of a handwheel required to adjust the machine for the next grind. The handwheel must be set through the use of a calibrated dial and this method, which is slow and conducive to errors in calculation and dial reading, requires a skilled grinding machine operator to produce consistently accurate work.

In a grinding machine incorporating the present invention, successive diameters of different size can be quickly and accurately ground without the difficult and time consuming manipulations previously required. In brief, in the preferred form of the invention, the wheelhead shaft, in plunge grinding, effects a predetermined axial movement, between preset limits, on each grind, regardless of the size diameter to be ground. For a plunge grind to produce a given diameter, the wheelhead occupies a predetermined position on the shaft and moves through a predetermined zone of movement during the grind. When the shaft reaches its final advanced limit of movement, the grinding wheel has moved with the wheelhead to a final grinding position to produce the given diameter required. A reversible readout unit is settable to give the grind diameter corresponding to the position of the wheelhead on the shaft. After the grind, the wheelhead shaft is retracted and, if the next grind is to be of a different diameter, the wheelhead is shifted on the shaft before the next grind is begun. The wheelhead, which is threadedly engaged with the shaft, is shifted on the shaft by means of a handwheel which rotates the shaft but does not effect axial movement thereof, and the readout unit is operated in response to rotation of the shaft to give a diameter reading corresponding to the instantaneous position of the wheelhead on the shaft. When the readout unit registers the desired new diameter, rotation of the handwheel is stopped, and the machine is ready to grind the new diameter. When the wheelhead shaft advances to the same limit as on the previous grind, the wheelhead and grinding wheel, by virtue of their adjustment on the wheelhead shaft, move to a new final position to produce a grind at the new diameter.

To initially set the readout unit, the shaft is advanced to final position with the wheelhead thereon in a position to effect a grind. After the grind, the wheelhead shaft is retracted without disturbing the position of the wheelhead on the shaft, and the size of the workpiece diameter ground is measured. This measurement, which corresponds to the position of the wheelhead on the shaft, is manually put into the readout unit. Thereafter, the handwheel can be turned to shift the wheelhead on the shaft until the readout unit registers a desired diameter, and the machine is ready for use.

Thus, to effect a series of plunge grinds of different diameters, only steps which can be quickly accomplished without great skill are required, and there is little chance for operator error. A simple sizing operation gives a dimension which is put, without conversion, into the readout unit. To change the wheelhead on the wheelhead shaft for a grind of different diameter, it is only necessary to rotate the handwheel until the new diameter registers on the readout unit. No calculations are required, no calibrated dial settings or readings need be made, nor is it necessary to count the rotations of the handwheel.

Although more steps are required in traverse grind operations than in plunge grind operations with the present invention, the steps are simple and, like the plunge grind operations, require no highly skillful manipulations and offer little chance of operator error.

It is therefore one object of the present invention to provide an improved machine tool feed system which can be quickly set to machine workpieces to different dimensions.

It is another object of the present invention to provide an improved grinding machine feed system which can be quickly set to grind a given diameter and quickly and easily adjusted to grind a different diameter.

It is another object of the present invention to provide an improved grinding machine feed system adjustable by the operator to grind different diameters without calculations or conversion of dimensions into angular rotation of a handwheel, and without setting or reading a calibrated dial.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Figure 1:
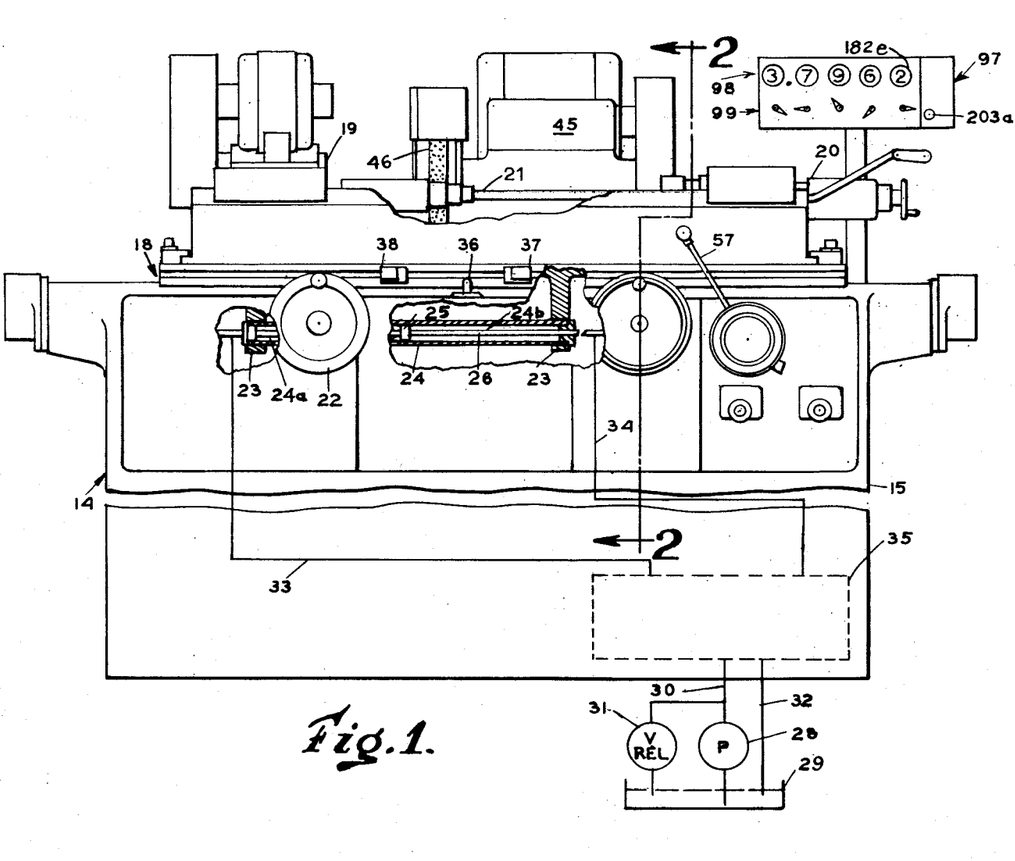
FIG. 1 is a front view, in elevation, of a grinding machine incorporating the present invention, with parts broken away for clarity.
Figure 2:
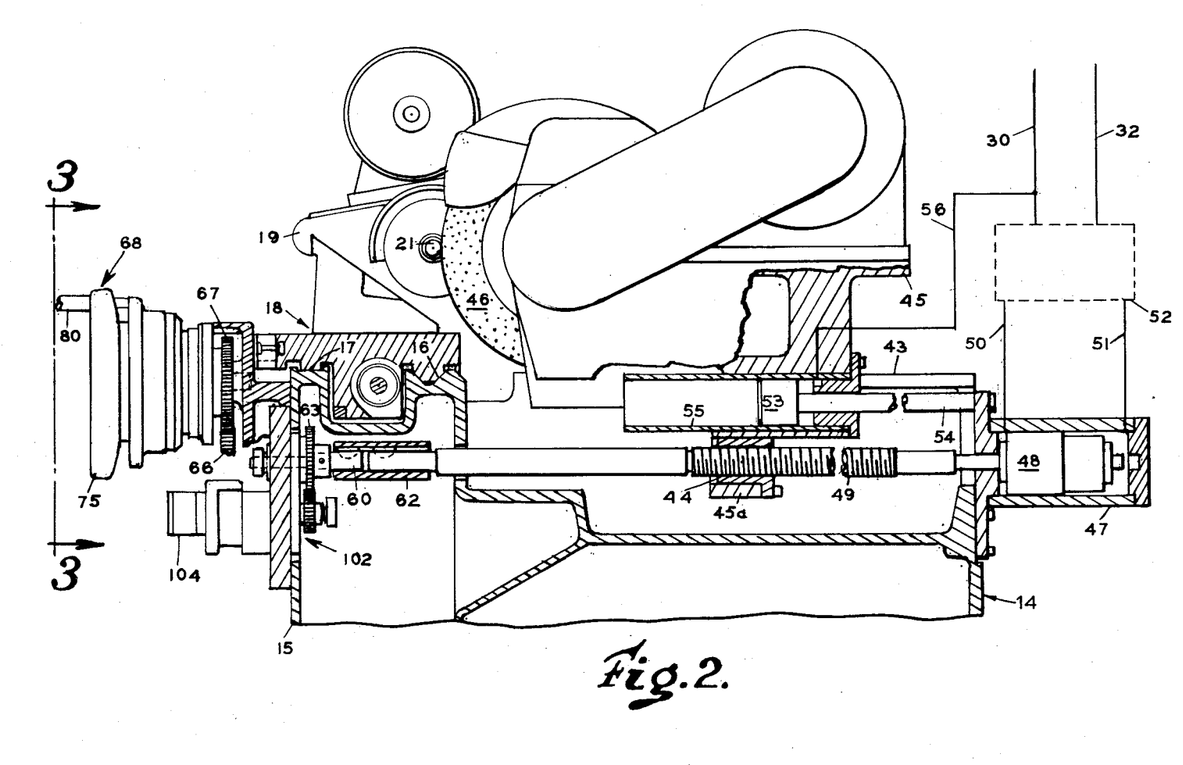
FIG. 2 is an enlarged side view taken on the line 2—2 of FIG. 1.

There is shown in FIGS. 1 and 2 a center type grinding machine 14 having a base 15 with longitudinal ways 16 and 17 to slidably receive and guide a table, indicated generally at 18, which defines a workpiece supporting member. A headstock 19 and tailstock 20 are secured in spaced relation on the table to support and rotate a workpiece 21 therebetween. A handwheel 22 is operatively connected to the table 18 for manual traverse movement thereof on the base to the left or right (as viewed in FIG. 1). Brackets 23, which depend from the table 18, carry a cylinder 24 for movement with the table. A piston 25 is received within the cylinder and is secured by piston rod 26 to the base 15. A hydraulic pump 28 takes fluid from sump 29 and delivers it under pressure to pressure line 30, which has a relief valve 31 connected thereto for discharge to the sump 29. Hydraulic fluid is returned to the sump through return line 32. Motor lines 33, 34 communicate through passages in rod 26 to cylinder chambers 24a and 24b, and power traversing movement of the table 18 is effected when required by alternate connection of these motor lines to pressure and return lines through a hydraulic traverse control circuit, indicated at 35, in response to actuation of a trip lever 36 by spaced table dogs 37, 38.

A tool carrying member, or wheelhead 45, having a grinding wheel 46 rotatably mounted therein which defines a tool or workpiece forming member, is slidably mounted on ways 43 of the base 15 for guided movement towards and away from the table 18, and workpiece 21 mounted thereon. A cylinder 47 is connected to the base 15 and has a piston 48 slidably received therein to define a fixed stroke feed motor. A threaded feed shaft 49, which is connected to piston 48, is threadedly received in a nut 44 secured in portion 45a of the wheelhead which depends between ways 43. Motor lines 50, 51 connected to the respective ends of cylinder 47 are alternately connected to pressure and return lines 30, 32 through a hydraulic infeed control circuit, indicated at 52, to advance and retract shaft 49 between limits defined by the limits of movement of piston 48 in cylinder 47. A piston 53, connected by rod 54 to base 15, is slidably received in a cylinder chamber 55 in the depending wheelhead portion 45a of the wheelhead. Pressure line 30 is continuously connected by line 56 to chamber 55 behind the piston to urge the wheelhead 45 rearwardly (but with less force than the connection of pressure line 30 to line 51 produces on piston 48) to take up the backlash between the wheelhead portion 45a and feed shaft 49 threadedly received therein. The hydraulic infeed control circuit 52 is operated by lever 57 and produces, on piston 48 for infeed movement, a rapid advance thereof from the rear end of cylinder 47, followed by a slower feed advance which is terminated when piston 48 engages the forward end of cylinder 47.

The elements of machine 14 described above, including the hydraulic traverse control circuit 35 and the hydraulic infeed control circuit 52, are similar to corresponding elements on the machine of the same type disclosed in U.S. Patent 2,254,002 of Decker and Ernst, issued August 26, 1941, and reference is made thereto for details not described and shown herein.

Figures 3, 4:
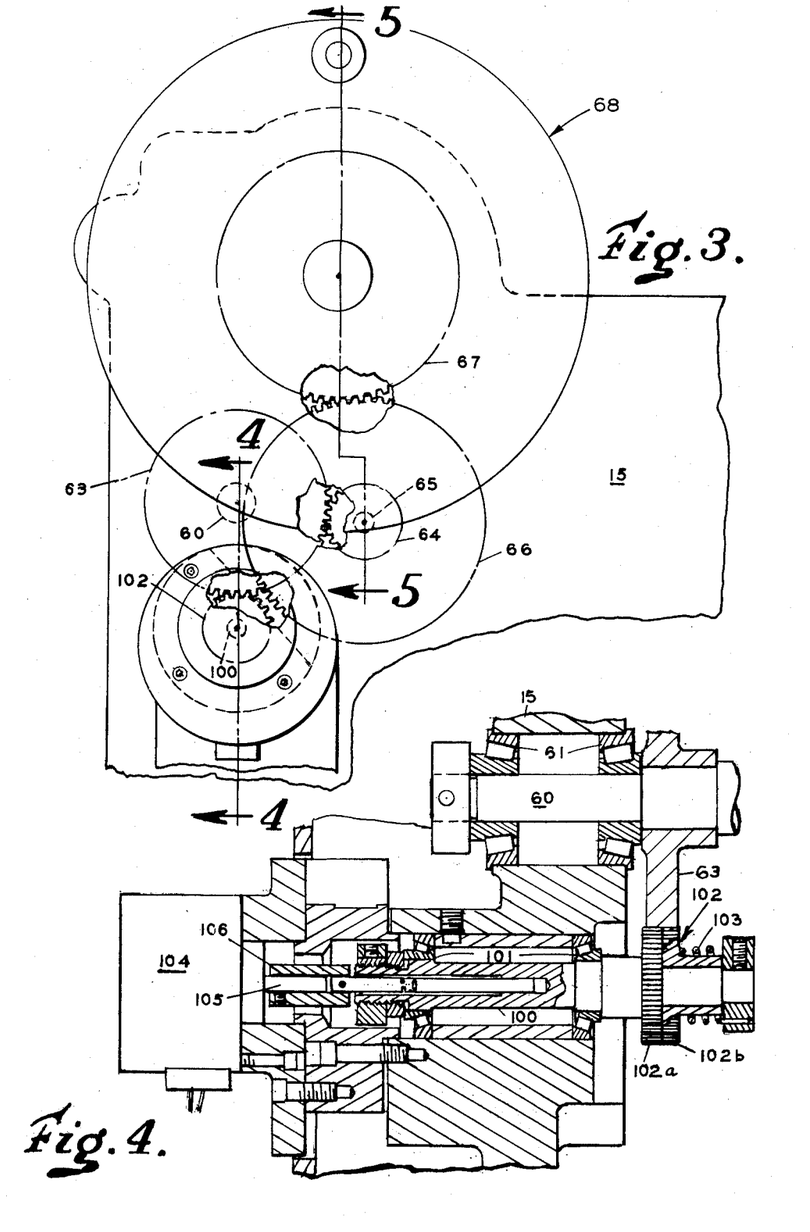
FIG. 3 is an enlarged view taken on the line 3—3 of FIG. 2.
FIG. 4 is an enlarged view taken on the line 4—4 of FIG. 3.

With a feed system of the type described, the feed member defined by the threaded shaft, or screw 49, moves axially, without rotation, through a predetermined feed cycle with a predetermined forward limit of movement, determined by the engagement of piston 48 with the positive stop defined by the forward end of cylinder 47. Since the wheel head 45 and grinding wheel 46 are moved by the feed shaft, and the feed shaft moves to a predetermined advanced limit, it is necessary to adjust the position of the wheelhead on the shaft if the final forward position of the grinding wheel is to be adjusted for grinding workpieces to different final sizes of selected diameters. For this purpose a handwheel is operatively connected to the feed screw 49 for rotation thereof to shift the position of the wheelhead on the screw 49. As shown best in FIG. 4, a stub shaft 60 is rotatably mounted in roller bearings 61 secured in base 15, and the shaft 60, which is coaxial with feed shaft 49, is coupled thereto through spline connector 62 (see FIG. 2). Stub shaft 60 has a gear 63 secured thereto which, as shown in FIG. 3, is engaged with idler gear 64 secured on a shaft 65 rotatably mounted in base 15. Shaft 65 also has secured thereon idler gear 66 which is engaged with gear 67 of the handwheel mechanism, indicated generally at 68.

Figures 5, 6:
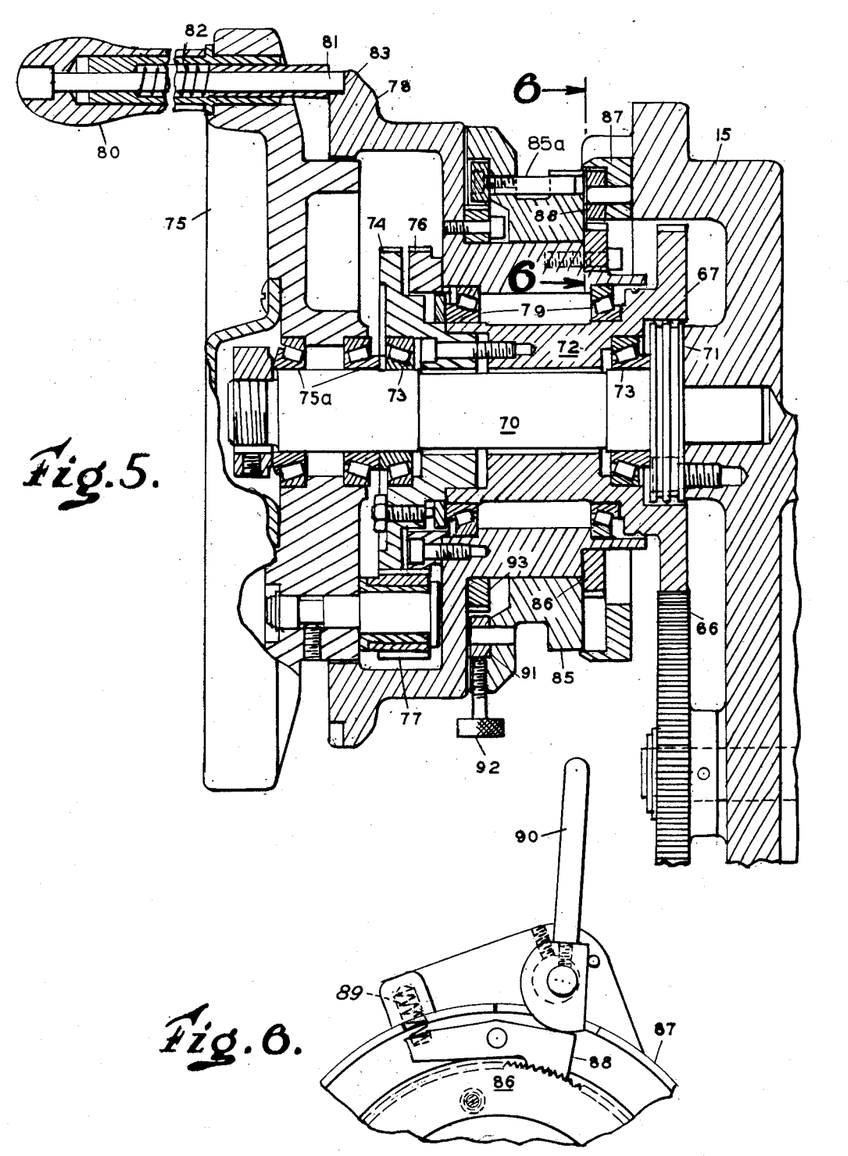
FIG. 5 is an enlarged view taken on the line 5—5 of FIG. 3.
FIG. 6 is a view taken on the line 6—6 of FIG. 5.

A two speed handwheel is provided to permit coarse, or relatively rapid, shifting of the wheelhead 45 relative to screw 49, and to permit a fine, or relatively slow, movement of the wheelhead on the screw. As shown in FIG. 5, the handwheel mechanism has a shaft 70 with flange 71 secured to base 15. Gear 67 is an integral part of an output member 72, which is mounted by roller bearings 73 on shaft 70 and has a gear 74 at its forward end. The handwheel 75, which is mounted on shaft 70 by means of roller bearings 75a, defines an input member which has an orbital gear 77 mounted thereon spaced from the axis of rotation of handwheel 75 as defined by the central axis of shaft 70. Orbital gear 77 is simultaneously engaged with gear 74 and a gear 76 of equal diameter to, and coaxial with, gear 74. Gear 76 is connected to an intermediate member 78 which is rotatably mounted by roller bearings 79 on output member 72. The handwheel, or input member, 75 has a handle 80 with a plunger 81 which is normally urged, by spring 82, into a slot 83 in intermediate member 78 to connect the handwheel 75 and intermediate member 78 for rotation as a unit. When handwheel 75 and intermediate member 78 are locked together by plunger 81 for rotation as a unit, gear 76 and orbital gear 77 rotate about the axis defined by shaft 70 and the orbital gear 77 cannot rotate on its axis as the handwheel is rotated. Instead, orbital gear 77 serves to lock gear 74 of the output member to gear 76, and hence to handwheel 75, and rotation is imparted from handwheel 75 through gears 67, 66, 64 and 63 to stub shaft 60, thereby rotating the feed shaft 49 and adjusting the position of the wheelhead thereon.

A much smaller adjustment of the wheelhead on the wheelhead shaft for each revolution of the handwheel is effected when the input member 75 is disconnected from the intermediate member 78 and the intermediate member is held against rotation. Intermediate member 78 has secured thereto an annular plate 86 having a serrated outer periphery. A rim 87 connected to base 15 has, as shown best in FIG. 6, a clamping member 88 pivotally mounted therein with a serrated jaw normally biased out of engagement with plate 86 by spring 89. The jaw of clamping member 88 can, however, be pressed into clamping engagement with plate 86 by the cammed lever 90 pivotally mounted in the base to lock intermediate member 78 against rotation.

Ring 85 has a clamping member 91, similar to clamping member 88, pivotally mounted therein which can be selectively clamped, by screw 92, to an annular plate 93 having a serrated outer periphery and secured to intermediate member 78. Ring 85, which has a stop pin 85a mounted therein, is unclamped and rendered ineffective when wheelhead adjustment is effected by the readout unit so further description of the operation thereof is not deemed necessary.

When clamping member 88 is rendered effective, intermediate member 78, and gear 76 thereof, are held against rotation. If plunger 81 is withdrawn from slot 83 by handle 80, and the handwheel rotated, orbital gear 77 will rotate about the axis defined by shaft 70 and, since gear 76 is locked, will also rotate about its own axis. There is one more tooth on gear 74 than on gear 76 and when gear 77 has made one revolution about the axis defined by shaft 70 (because of one revolution of handwheel 75) gear 74 will have rotated through an angle corresponding to one tooth thereon. If gear 74 has 100 teeth, and gear 76 has 99 teeth, it will take 100 revolutions of the handwheel to effect a single revolution of gear 74, and hence of gear 67. Thus extremely fine adjustment of the wheelhead 45 on the feed shaft 49 is possible.

As shown in FIGS. 3 and 4, a shaft 100 is rotatably mounted in the base 15 by means of roller bearings 101 and has a gear 102 thereon engaged with gear 63 on the stub shaft 60 for rotation of shaft 100 with the handwheel 75 and feed shaft 49. The gear 102 comprises a section 102a integral with shaft 100 and a section 102b angularly biased on shaft 100 by spring 103 to eliminate backlash in the engagement between gears 63 and 102. A pulse generator 104 has a shaft 105 connected to shaft 100 for rotation thereby through coupling 106. Thus, shaft 105 is rotated when, and only when, the feed shaft 49 is rotated, and hence, when, and only when, the wheelhead 45 is moved relative to the feed shaft.

A readout unit 97 is mounted, as shown in FIG. 1, for visual inspection by the operator. The readout unit displays a number 98 and is operatively connected to the pulse generator 104 to change the number 98, previously set therein, on rotation of the screw. Since the readout unit is connected to the pulse generator to change the number 98 when the feed screw 49 is rotated, the number 98 changes when the position of the wheelhead on the screw changes because the position of the wheelhead on the screw changes when and only when the screw is rotated. The screw, during each grind, moves axially without rotation to the same extreme forward position so the final size of the workpiece is determined, not by the final forward position of the screw (which is the same in every grind), but by the position of the wheelhead on the screw. Therefore, the number 98 can be set into the readout unit to read the diameter corresponding to the current position of the wheelhead on the screw, and the system between the screw and the readout unit is designed to change the number 98 according to change in diameter of workpiece corresponding to change in the position of the wheelhead on the screw. The diameter corresponding to a position of the wheelhead on the screw is determined by a preliminary grind, and this diameter is manually put into the readout unit by the set 99 of manually adjustable switches. Thereafter, the wheelhead is positioned on the screw by the handwheel before each grind requiring a new diameter, and the readout unit gives the diameter corresponding to the instantaneous position of the wheelhead on the screw so that the operator, knowing the new diameter required, rotates the handwheel until the readout unit tells him, by indicating the desired diameter, that the wheelhead has reached the position on the screw to produce that diameter.

Figure 7:
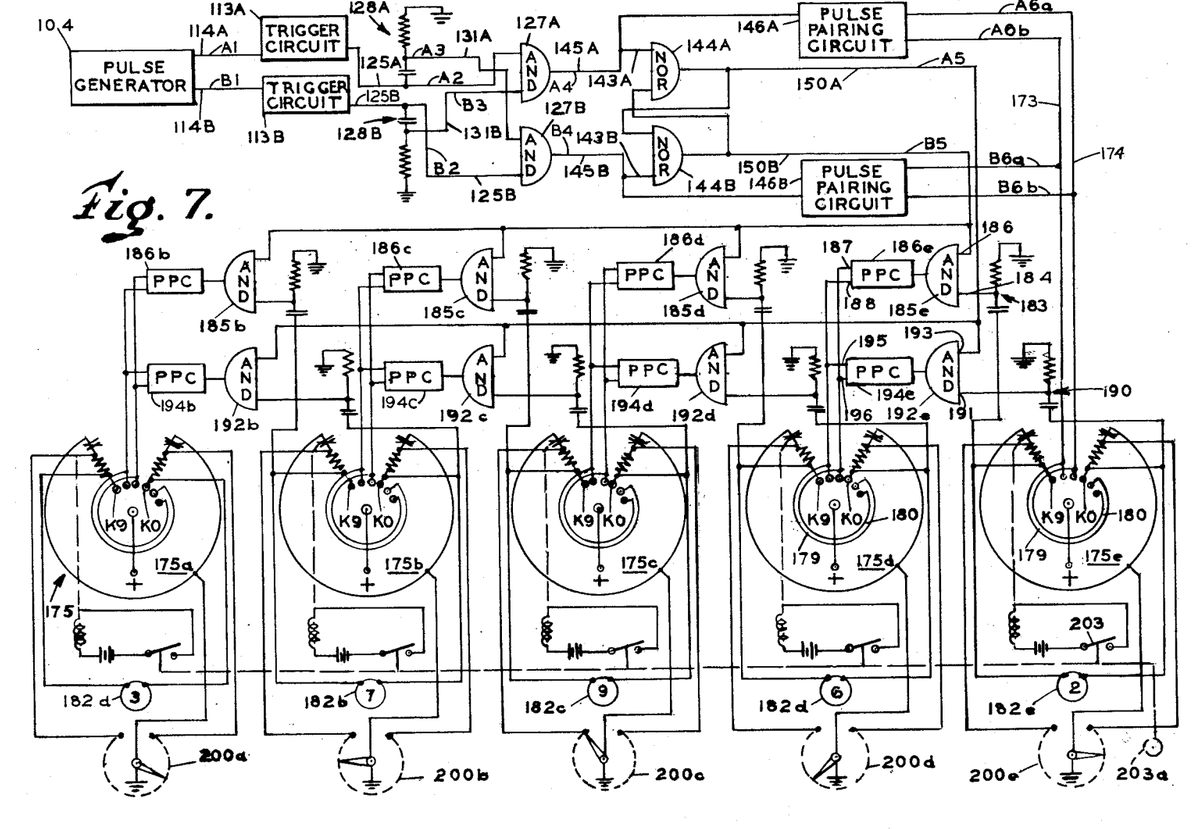
FIG. 7 is a schematic diagram showing in block diagram form electrical units of the illustrated form of the present invention.
Figure 8:
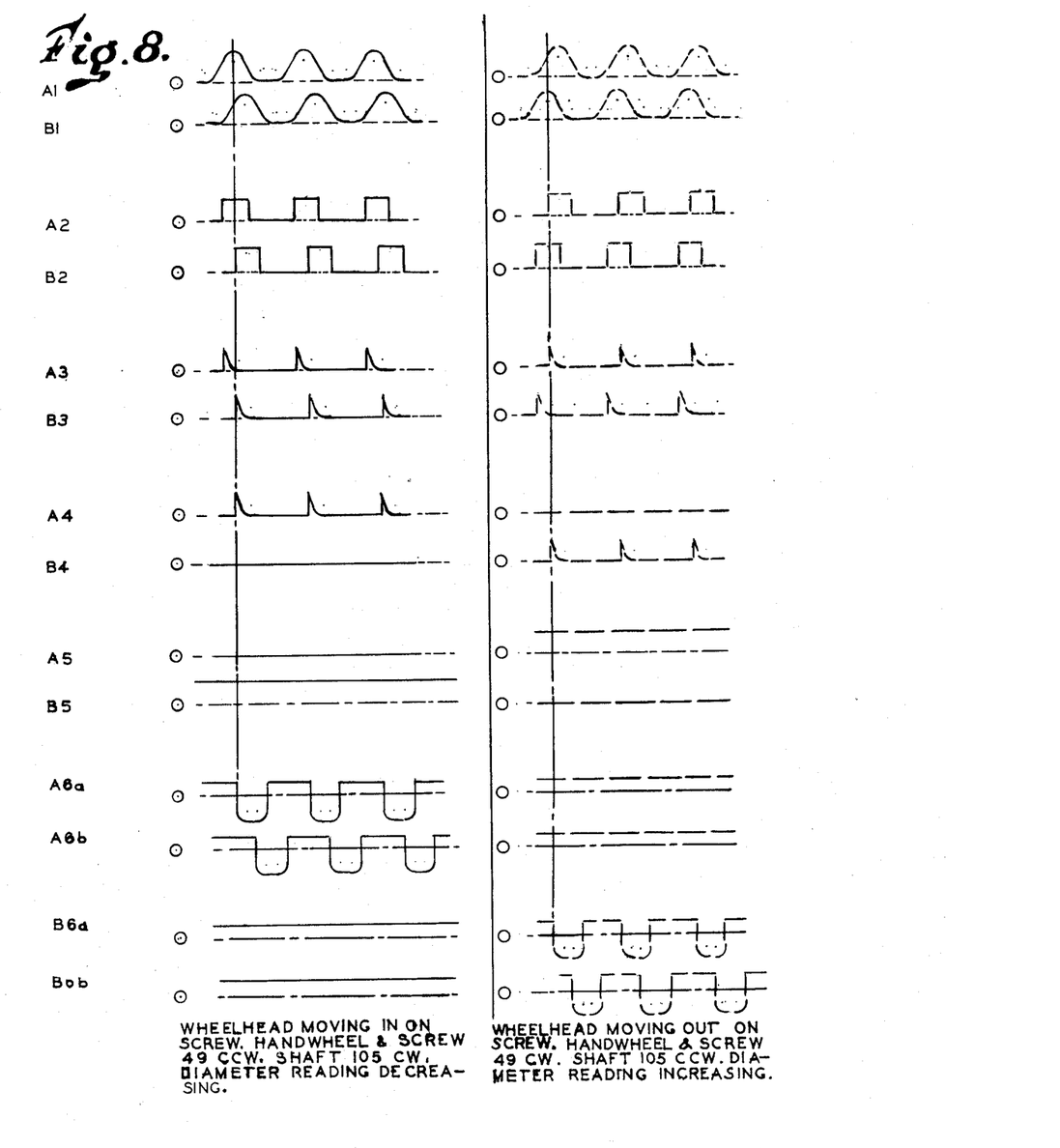
FIG. 8 is a chart showing pulses generated in the electrical system of FIG. 7.
Figure 9:
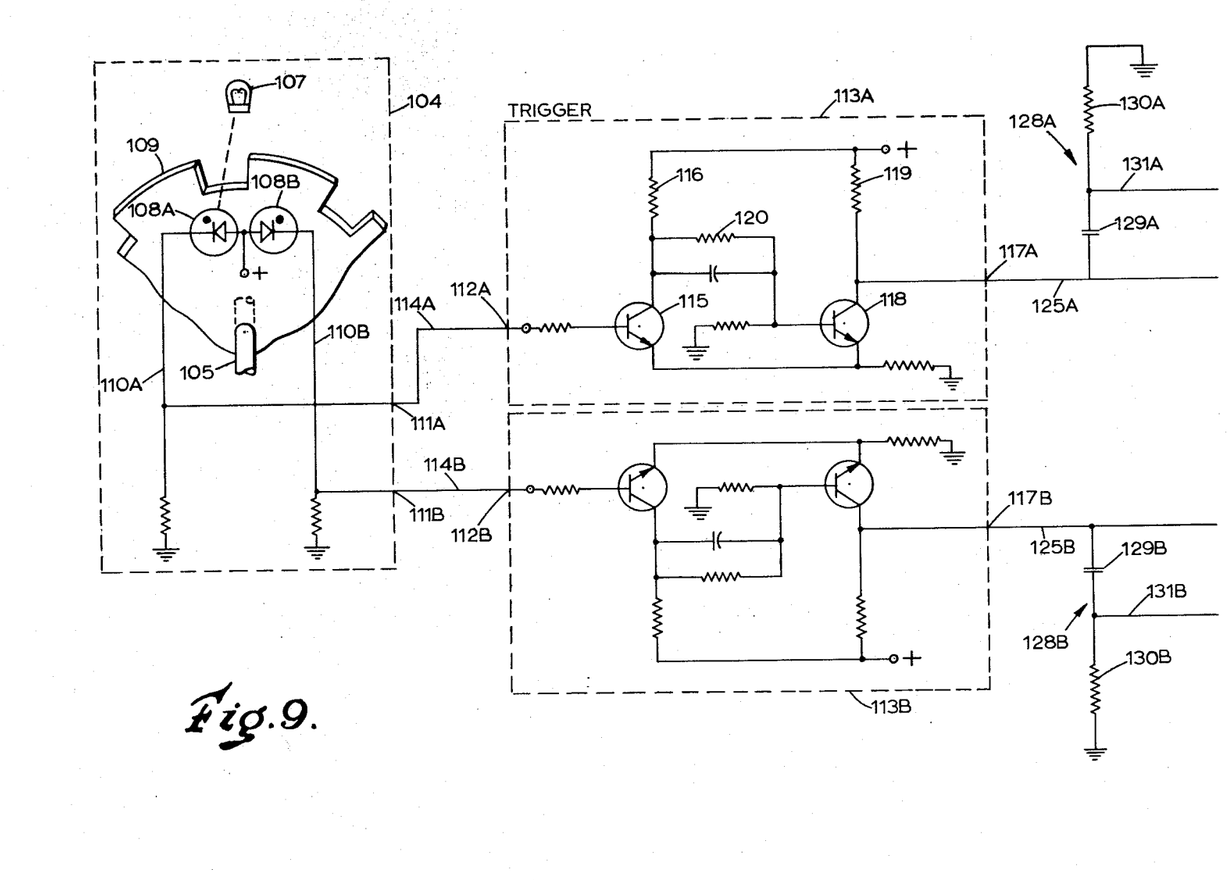
FIGS. 9, 10, and 11 are electrical diagrams showing some of the electrical units of FIG. 7 in more detail.
Figure 10:
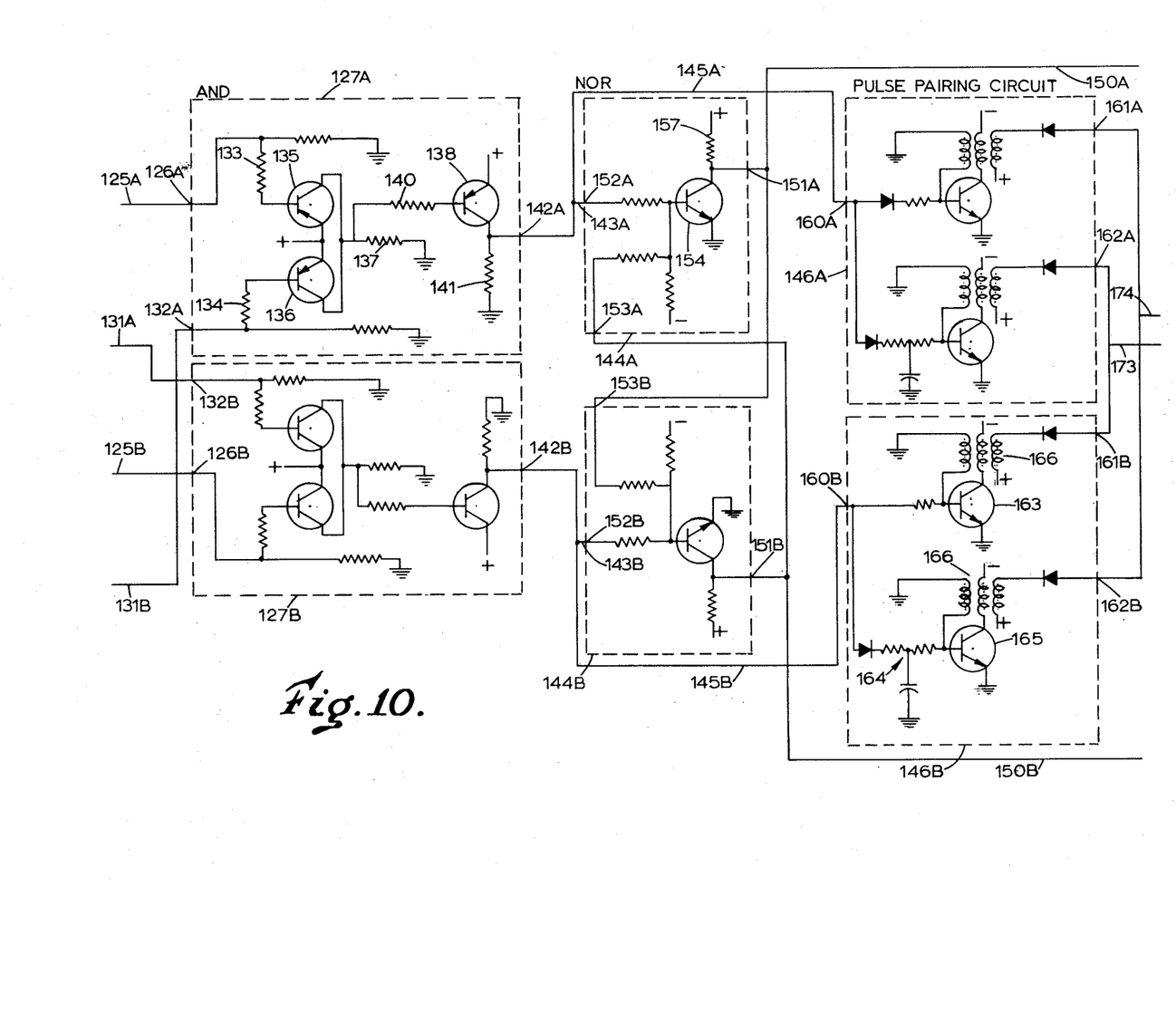
Figure 11:
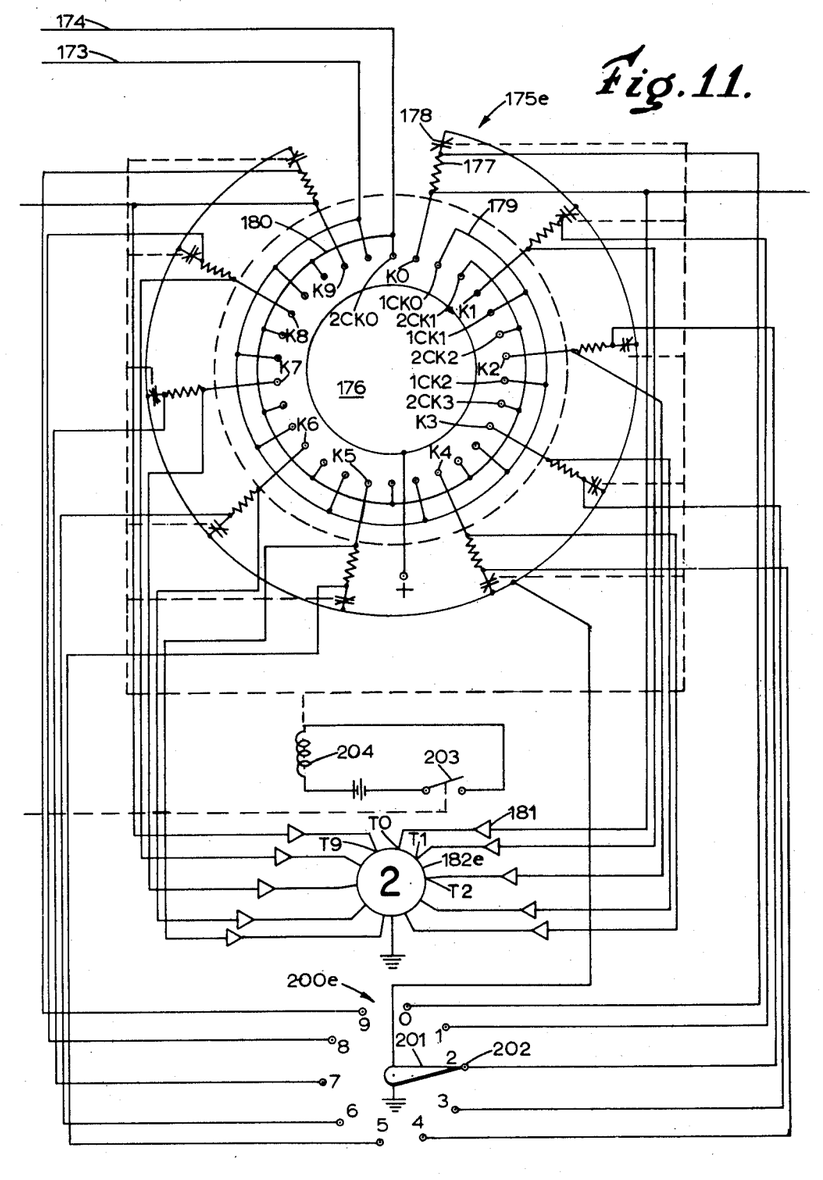

One method for connecting the readout unit 97 to the pulse generator 104 is shown schematically in FIG. 7 with portions of the system shown in more detail in FIGS. 9, 10, and 11, to illustrate a system having the necessary characteristics for the improved feed system of the present invention. The pulse generator 104 which may, for example, be similar to the General Dynamics Optisyn pulse generator, model 27, or may be as shown schematically in FIG. 9, produces phase related pulse pairs, each pair comprising a pulse A1 supplied to one output terminal and a pulse B1 supplied to another output terminal. As shown in FIG. 8, pulse A1 leads pulse B1 when the feed screw 49 is rotated in one direction, and pulse B1 leads pulse A1 when the screw is rotated in the opposite direction. For this purpose, the pulse generator, as shown in FIG. 9, may have a lamp 107, a pair of closely spaced phototransistors 108A and 108B, and a slotted disc 109 connected to shaft 105 and interposed between the lamp and the pair of phototransistors. Phototransistor 108A is connected in circuit 110A to produce pulse A1 at output terminal 111A as it is exposed to light, and phototransistor 108B is connected in circuit 110B to produce pulse B1 at output terminal 111B as it is exposed to light. As the handwheel is turned counterclockwise to rotate feed shaft 49 counterclockwise and advance the wheelhead on the screw 49, the shaft 105 rotates clockwise and pulse A1 leads pulse B1; as the handwheel is turned clockwise to rotate feed shaft 49 clockwise and retract the wheelhead on the screw, the shaft 105 rotates counterclockwise and pulse B1 leads pulse A1.

The output terminals 111A and 111B are connected, respectively, to input terminals 112A, 112B of trigger circuits 113A, 113B through lines 114A, 114B. In each trigger circuit, which may be similar to the Schmitt trigger circuit, the input is connected to the base of an NPN transistor 115 having a collector circuit containing load resistor 116. The output terminal (117A, 117B) of the trigger circuit is connected in the collector circuit of an NPN transistor 118, the collector circuit containing load resistor 119. The base of transistor 118 is connected through a resistor 120 to the collector circuit of transistor 115. When the input signal at input terminal (112A, 112B) is too low to cause transistor 115 to conduct, the base of transistor 118 is at a voltage which causes transistor 118 to conduct. Because of the drop across resistor 119, the output voltage at terminal (117A, 117B) is low until the input signal to the trigger circuit increases to cause transistor 115 to conduct. Because of the drop across resistor 116, the voltage supplied to the base of transistor 118 drops, terminating conduction through that transistor, and increasing the voltage at the output terminal (117A, 117B).

The square pulse output (A2, B2) from each trigger circuit is supplied through a line (125A, 125B) to both an input terminal (126A, 126B) of an AND circuit (127A, 127B) and a pulse shaping circuit (128A, 128B). Each pulse shaping circuit contains a capacitor (129A, 129B) and a resistor (130A, 130B) to produce an impulse, or spike pulse (A3, B3) in line 131A, 131B. Line 131A is connected to a second input terminal 132B of AND circuit 127B and line 131B is connected to a second input terminal 132A of AND circuit 127A. The two pulses supplied to each AND circuit 127A, 127B are fed, respectively, through base resistors 133, 134 to the bases of PNP transistors 135, 136, each of which is biased to conduct when no pulse is supplied to the base thereof and is cut off in response to a pulse at the base. An output voltage is produced across resistor 137 when either transistor 135 or 136, or both, conduct, which voltage drops to zero when pulses are simultaneously supplied to the transistor bases so that neither transistor conducts. As the voltage across resistor 137 drops, the voltage at the base of transistor 138, which is connected through resistor 140 to the collectors of both transistors 135 and 136 drops. Transistor 138 is biased to conduct only when the voltage at the base thereof drops so an impulse, or spike pulse, is produced across load resistor 141 in response to the simultaneous appearance of voltages at the bases of transistors 135, 136. Thus, an impulse, or spiked voltage, pulse A4, B4 is produced at the output terminals 142A, 142B of each AND circuit only when pulses appear simultaneously at both input terminals of each AND circuit. On clockwise rotation of shaft 105, during which pulse A1 leads pulse B1 (and hence pulse A2 leads pulse B2), pulse A3, which is triggered at the beginning of pulse A2, decays before pulse B2 begins (see FIG. 8) so there is never simultaneous appearance of two voltage pulses at the input of AND circuit 127B (see FIG. 7) and the pulse B4 is not produced. During clockwise rotation of shaft 105, however, pulse B3, which is triggered at the beginning of pulse B2, is produced before pulse A2 terminates so there is, periodically, simultaneous appearance of two voltage pulses at the input of AND circuit 127A. On counterclockwise rotation of shaft 105, pulse B3 decays before pulse A2 begins, and there is no simultaneous appearance of two pulses at the input of AND circuit 127A so pulse A4 is not produced. However, pulses A3 and B2 appear simultaneously at the input terminals of AND circuit 127B to produce the pulse B4 at the output terminal thereof.

The output terminal 142A of AND circuit 127A is connected through line 143A to NOR circuit 144A and through line 145A to a pulse pairing circuit 146A. The output terminal 142B of AND circuit 127B is connected through line 143B to NOR circuit 144B and through line 145B to a pulse pairing circuit 146B. The two NOR circuits 144A, 144B are connected in a flip-flop configuration to produce a voltage signal in line 150B, connected to output terminal 151B of NOR circuit 144B, only when there is clockwise rotation of shaft 105 and to produce a voltage signal in line 150A, connected to output terminal 151A of NOR circuit 144A, only when there is counterclockwise rotation of shaft 105. One input terminal 152A of NOR circuit 144A is connected to line 143A and another input terminal 153A of that circuit is connected to output terminal 151B of NOR circuit 144B. One input terminal 152B of NOR circuit 144B is connected to line 143B and another input terminal 153B of that circuit is connected to output terminal 151A of NOR circuit 144A. The NOR circuit consists of an NPN transistor 154 biased to conduct when a positive voltage appears at the base thereof by virtue of a positive voltage at either input terminal. If no positive signal is impressed on either input terminal, the transistor does not conduct and a positive voltage is present at the output terminal. When a positive voltage signal is received at either terminal, the transistor conducts and, by virtue of the voltage drop across the load resistor 157 in the collector circuit of transistor 154, the voltage at the output terminal drops. Because the output terminal of each NOR circuit is connected to one of the input terminals of the other NOR circuit, one, and only one, of the circuits has a voltage output at a time. If, for example, the transistor in circuit 144B is conducting, and the transistor in circuit 144A is cut off, the voltage at input terminal 153A will not be great enough to initiate conduction of the transistor in circuit 144A, but the voltage at input terminal 153B will sustain conduction of the transistor in circuit 144B. If clockwise rotation of shaft 105 is begun, a positive pulse will appear at input terminal 152A sufficient to initiate conduction of the transistor of circuit 144A which will drop the output voltage at output terminal 151A, and hence at input terminal 153B. Thus conduction of the transistor in circuit 144B will stop and the voltage at output terminal 151B thereof will rise to raise the input voltage at terminal 153A and sustain the conduction of the transistor in circuit 144A. Subsequent pulses in line 143A will have no effect on the outputs of circuits 144A and 144B. Thus on clockwise rotation of shaft 105, a positive voltage B5 appears in line 150B connected to the output terminal 151B of circuit 144B. On counterclockwise rotation of shaft 105, pulses appear in line 143B connected to circuit 144B and a positive voltage A5 is produced in line 150A connected to the output terminal of circuit 144A.

Each single pulse A4 appearing during clockwise rotation of shaft 105 at the input terminal 160A of pulse pairing circuit 146A, which terminal is connected to line 145A, produces a pair of phase related pulses at the output terminals 161A and 162A of the pulse pairing circuit, the first pulse A6a appearing at output terminal 161A and the second pulse A6b appearing at output terminal 162A. Similarly, each single pulse B4 appearing during counterclockwise rotation of shaft 105 at the input terminal 160B of pulse pairing circuit 146B, which terminal is connected to line 145B, produces a pair of phase related pulses at the output terminals 161B and 162B of the pulse pairing circuit, the first pulse B6a appearing at output terminal 161B and the second pulse appearing at output terminal 162B. The pulse signal received at the input terminal of each pulse pairing circuit is transmitted to the base of NPN transistor 163 and to a time delay circuit 164 which transmits the pulse to the base of NPN transistor 165 after the pulse has been applied to the base of transistor 163. Each transistor 163, 165 is connected in circuit with an output transformer 166 to amplify the pulse, the secondary of each transformer being connected to one of the output terminals of the pulse pairing circuit. Each secondary connected to an output terminal is biased so that in the absence of signal at the base of the transistor, the voltage at the output terminal is positive, with each pulse at the base of the transistor driving the output voltage negative. The time delay circuit 164 has parameters which cause the out-of-phase pulses of each pair at the output terminal to overlap slightly. Each pair of pulses is spaced from the succeeding pair of pulses so that the output terminals of pulse pairing circuit 146A, during clockwise rotation of shaft 105, are, in sequence: both positive, terminal 161A negative and terminal 162A positive, both negative momentarily, terminal 161A positive and 162A negative, and both positive. During counterclockwise rotation of shaft 105, the output terminals of pulse pairing circuit 146B are, in sequence: both positive; terminal 161B negative and terminal 162B positive; both negative momentarily, terminal 161B positive and terminal 162B negative, and both positive.

The electronic cold cathode counting tubes shown 175a, 175b, 175c, 175d, and 175e define a counter 175 and each control one digit of the workpiece size indicating number 98, the tube 175a controlling the first digit and the tube 175e controlling the last digit. Each tube has a positively biased anode 176 encircled by thirty equally spaced electrodes comprising three groups of ten electrodes each. Every third electrode, which may be considered numeral, or digit, cathodes, define one group of electrodes which are designated K0, K1, K2 . . . K9 and which are each connected to ground through a load resistor 177 and a normally closed switch contact 178. All the cathodes next to the numeral cathodes in the clockwise direction, which may be considered first control electrodes, define a group of electrodes designated 1CK0, 1CK1, 1CK2 . . . 1CK9 and which are all connected to a common line 179. All the cathodes next to the numeral cathodes in the counterclockwise direction, which may be considered second control electrodes, define a group of electrodes designated 2CK0, 2CK1, 2CK2 . . . 2CK9 and which are all connected to a common line 180. In the cold cathode counting tube a discharge occurs between the anode and only one of the cathode electrodes, the discharge jumping from one electrode to an adjacent electrode if said adjacent electrode is made more negative than the one electrode.

Each numeral, or digit, cathode K0, K1, K2 . . . K9 of each tube is connected through an amplifier 181 to one digit element of a set of digit elements, one of which is energized at a time to comprise one digit of number 98 (FIG. 1). While each set of digit elements could comprise, for example, a series of ten lamps, there is shown a digit indicator tube (see 182a, 182b, 182c, 182d, 182e) such as the Nixie tube manufactured by Burroughs Corp., which gives a particular digital reading when voltage is supplied to a particular terminal (T0, T1, T2 . . . T9) in response to the voltage developed across one of the load resistors 177 when discharge in the counting tube is occurring between a particular numeral cathode and the anode. The line 179 of counting tube 175e is connected through line 173 to output terminal 162A of pulse pairing circuit 146A and output terminal 161B of pulse pairing circuit 146B. The line 180 is connected through line 174 to output terminal 161A of pulse pairing circuit 146A and output terminal 162B of pulse pairing circuit 146B. If shaft 105 is rotated clockwise, pulses are supplied to lines 179 and 180 by pulse pairing circuit 146A only and the first pulse is supplied to line 180. If shaft 105 is rotated counterclockwise, pulses are supplied to lines 179 and 180 by pulse pairing circuit 146B only, with the first pulse supplied to line 179.

If, in counting tube 175e, which controls the final digit of the readout, discharge is occurring between numeral cathode K2 and the anode, the final digit on the readout will be 2. On clockwise rotation of shaft 105, a negative pulse will first be transmitted, through line 180, to all the second control electrodes 2CK0, 2CK1, 2CK2 . . . 2CK9. The discharge will jump counterclockwise from cathode K2 to cathode 2CK2 since this negative electrode is closer than the next nearest negative electrode 2CK3. This removes voltage from the "2" terminal on the indicator tube 182e and the numeral 2 thereon is extinguished. A negative pulse is transmitted through line 179 to all the first control electrodes 1CK0, 1CK1, 1CK2, . . . 1CK9 before the negative pulse terminates on the second control electrodes, and when the second control electrodes go positive, the discharge jumps from electrode 2CK2 to 1CK1. When the first control electrodes go positive (and while the second control electrodes are still positive) the discharge jumps from control electrode 1CK1 to numeral cathode K1, energizing the numeral "1" in the indicating tube 182e. Counterclockwise rotation of shaft 105 produces paired pulses at the output terminals of pulse pairing circuit 146B and not 146A, and hence the first pulse is supplied to line 179 and the discharge is passed from electrode to electrode in the counting tube 175e in a clockwise direction, successively lighting digits in the indicator tube in increasing order.

If the shaft 105 is rotated clockwise and the digits in the readout unit 97 are decreasing, it is necessary to decrease the penultimate readout digit, indicated by indicator tube 182d, each time the final digit in indicator tube 182e reaches nine, and only when it reaches nine. If the shaft 105 is rotated counterclockwise and the digits in the readout unit are increasing, it is necessary to increase the penultimate readout digit in indicator tube 182d each time the final digit in indicator tube 182e reaches zero, and only when it reaches zero. Similarly, each of the indicator tubes 182a, 182b, 182c must, during clockwise rotation of shaft 105, subtract one number when and only when the succeeding indicator tube registers nine and, during counterclockwise rotation of shaft 105, must add one number when, and only when, the succeeding tube registers zero. For this purpose each of the numeral cathodes K9 of counting tubes 175b, 175c, 175d, and 175e are connected, through a shaping circuit 183 to one 184 of the terminals of an AND circuit 185b, 185c, 185d, and 185e, respectively, to produce a positive pulse at that terminal when and only when the discharge occurs between the numeral cathode K9 and the anode of the respective counting tubes. Each of the other terminals 186 of AND circuits 185b, 185c, 185d, 185e is connected to line 150B which places a positive voltage on terminal 186 whenever clockwise rotation of shaft 105 occurs. Thus during clockwise rotation only of shaft 105 a positive pulse is transmitted from the output of each AND circuit 185b, 185c, 185d and 185e to the input of respective pulse pairing circuits 186b, 186c, 186d, and 186e when and only when a discharge occurs between cathode K9 and the anode of the tubes 175b, 175c, 175d, and 175e.

Each pulse pairing circuit produces two out of phase and overlapping pulses, the first of which appears at output terminal 187 and the second of which appears at output terminal 188. The output terminals 187, 188 of pulse pairing circuit 186e are connected, respectively to lines 180, 179 of counting tube 175d; the output terminals 187, 188 of pulse pairing circuit 186d are connected, respectively, to line 180, 179 of counting tube 175c; the output terminals 187, 188 of pulse pairing circuit 186c are connected, respectively, to lines 180, 179 of counting tube 175b; and the output terminals 187, 188 of pulse pairing circuit 186b are connected, respectively to lines 180, 179 of counting tube 175a.

Each of the numeral cathodes K0 of counting tubes 175b, 175c, 175d, and 175e is connected, through a shaping circuit 190 to one 191 of the terminals of an AND circuit 192b, 192c, 192d, and 192e respectively to produce a pulse at terminals 191 when, and only when, discharge occurs between the numeral cathode K0 and the anode of the counting tube to which the AND circuit is connected. The other terminal 193 of each AND circuit 192b, 192c, 192d, and 192e is connected to line 150A which places a positive voltage on terminals 193 when, and only when, counterclockwise rotation of shaft 105 occurs. The input terminals of pulse pairing of circuits 194b, 194c, 194d, 194e are connected respectively to the output terminals of AND circuits 192b, 192c, 192d, 192e. Pairs of pulses are produced at the output terminals 195, 196 of the pulse pairing circuits, the first pulse appearing at terminal 195 and the second pulse appearing at terminal 196. The output terminals 195, 196, of pulse pairing circuit 194e are connected respectively to lines 179, 180, of counting tube 175d; the output terminals 195, 196 of pulse pairing circuit 194d are connected, respectively, to lines 179, 180 of counting tube 175c; the output terminals 195, 196 of pulse pairing circuit 194c are connected respectively to lines 179, 180 of counting tube 175b; the output terminals 195, 196 of pulse pairing circuit 194b are connected, respectively, to lines 179, 180 of counting tube 175a.

Each counting tube has a ten terminal setting switch 200a, 200b, 200c, 200d, 200e (indicated generally at 99 in FIG. 1) connected thereto for setting the counting tube (and hence each indicating tube 182a, 182b, 192c, 182d, 182e). The wiper arm 201 of each switch is connected to ground and the terminals 202 are each connected between the load resistor 177 and the normally closed contact 178 in each numeral cathode circuit. A switch 203 energizes a relay 204 which, when energized, opens the contacts of all switches 178 of the counting tube, and a switch button 203a is provided for simultaneous momentary actuation of all switches 203. To set a counting tube, the wiper arm 201 of the setting switch is set on the numeral desired in the readout and the switch 203 is closed to open all contacts 178 of the counting tube. The numeral cathode circuit connected to the terminal on which the wiper arm is set is grounded through the setting switch and the discharge jumps to this numeral cathode to energize this numeral on the readout. Thereafter, the switch 203 is opened to close all the contacts 178. The discharge will continue between the anode and this numeral cathode until shifted clockwise or counterclockwise therefrom by signals received on lines 179, 180. The switches 203 of each of the setting switches 200a, 200b, 200c, 200d, 200e may be connected together for simultaneous operation after the wiper arm of each switch has been set to a desired terminal. It will be noted that each numeral of number 98 can be set independently of other numerals thereof, so that it is not necessary, when changing the readout setting to a new dimension, to progress up or down to the new dimension in numerical sequence.

The readout corresponds to a dimension and, with switches 203 opened, the readout changes when the position of the wheelhead on the wheelhead shaft changes. While the change in the readout dimension will always correspond to the extent of change of the position of the wheelhead on the wheelhead shaft, it is not necessary that the change in dimension on the readout equal the dimensional change of position of the wheelhead on the wheelhead shaft effecting the readout change. For example, it is convenient to work with dimensions measuring the diameter of a workpiece. A given change of position of the wheelhead on the wheelhead shaft of, say, 0.10 inch will, however, effect a change of 0.20 inch in the diameter of the shaft and therefore, the readout can be connected to the wheelhead shaft to give a change of reading, or rotation of the wheelhead shaft, twice the distance of movement of the wheelhead on the shaft effected by that shaft rotation. For example, in an actual machine constructed, each rotation of the handwheel (when connected to the feed shaft for coarse feed) produced an adjustment of the wheelhead on the feed shaft of .050 inch, corresponding to a diameter change of .1000 inch. The pulse generator was connected to the feed screw to produce 1000 pairs of pulses for each revolution of the handwheel.

Before commencing operation, it is necessary to synchronize the readout unit with the machine. This is accomplished by taking a preliminary grind with the wheelhead in any convenient position on the screw 49 and moving the screw to its predetermined extreme forward position. The screw is then retracted and the diameter ground on the workpiece is measured with, for example, a micrometer. The advance and retraction of the screw is effected by control handle 57 and without rotation of handwheel 68 so the wheelhead remains in the selected position on the screw, which position corresponds to the diameter ground. The diameter of the piece is then put into the set 99 of setting switches by manually setting the switch arm 201 of each setting switch 200 to the appropriate digit. Switch 203a is then closed, and opened, to momentarily open and close all the normally closed switch contacts 178 in all the tubes, thereby energizing the appropriate digits in each of the indicator tubes 182 so the number 98 on the readout unit reads the actual size of ground piece.

In plunge grind operation, the traversing circuit 35 is ineffective and the table 18 is positioned, in the traverse direction, by handwheel 22. The handwheel 68 is rotated in coarse setting (with clamping member 88 released and rod 81 in) before the first grind to advance or retract the wheelhead on the screw until the number 98 approaches the diameter desired on the first grind. The handwheel is then set to the fine setting (with clamping member 88 clamped and rod 81 out) so that the change of the final digit can be observed and adjustment of the wheelhead on the screw stopped when the number 98 reads the desired diameter. Thereafter, when the feed screw 49, by operation of handle 57, is moved axially without rotation through its predetermined feed cycle, the piece will be ground to the diameter indicated in the readout unit. Each time the diameter of the piece to be ground (or the section of the piece to be ground) differs from the diameter of the preceding grind, the wheelhead is adjusted on the screw before the grind until the number 98 in the readout unit indicates the desired diameter.

In traverse grind operations, the infeed control circuit 52 is rendered ineffective with the feed screw 49 in its extreme forward positon. The wheelhead is moved in on the screw until the grinding wheel touches the work. The table is reciprocated by traverse control circuit 35, trip lever 36, and dogs 37, 38. At the end of each stroke of the table, the wheelhead is moved in a predetermined increment, by handwheel 68, or by a pick feed mechanism which rotates the feed screw through a predetermined angle, similar to the mechanism shown in U.S. Patent 2,254,002. The readout unit is observed by the operator and, as the reading approaches final desired size, the pick feed mechanism is stopped and the final positioning of the wheelhead is effected by the operator with handwheel 68. Thereafter, final traversing is effected and the wheelhead retracted by handwheel 68.

When the grinding wheel is trued, the readout unit may be resynchronized with the machine in the same manner as originally sychronized. If, however, the amount of incremental advance of the truing diamond from the previous truing operation is known, this amount, which corresponds to the reduction in radius of the grinding wheel from the previous truing operation, would effect a corresponding increase in radius of the workpiece if the wheelhead were not adjusted on the shaft. Thus, if the readout reading is changed (by setting switches 99 and switch button 203a) to increase the current diameter reading by twice the advance of the truing diamond, the readout unit will be resynchronized with the machine.

For either type of grinding operation, the mechanism of the present invention provides a readout unit which is quickly and easily synchronized with the machine and effective to give the precise position of the tool member on a feed member in terms of the size to which the workpiece will be machined with the tool member in that position on the feed member. Thus, the machine can quickly be set for an operation without calculations and without conversion of dimensions into required rotation of a handwheel.

What is claimed is:
1. In a grinding machine, the combination comprising:
 (a) a wheelhead having a nut therein,
 (b) a feed screw threadedly received in said nut,
 (c) a reversible feed motor connected to the feed screw to move the screw axially without rotation through a predetermined feed cycle,
 (d) a two speed handwheel operable to effect fast and slow relative rotation between the feed screw and the nut for movement of the wheelhead on the screw.
 (e) a readout unit settable to a workpiece size indicating reading corresponding to any given position of the wheelhead on the screw.
 (f) a pulse generator operable in response to relative rotation between the nut and screw to produce pulses proportional in quantity to the extent of movement of the wheelhead on the screw and indicative of the direction of said movement,
 (g) a reversible electronic counter operable in response to pulses produced by the pulse generator to change said reading as the wheelhead is moved from a given position on the screw in accordance with the direction and extent of wheelhead movement on the screw.

2. In a grinding machine, the combination comprising:
 (a) a wheelhead having a rotatable grinding wheel carried thereby and a nut received therein,
 (b) a feed screw threadedly received in said nut,
 (c) a reversible feed motor connected to the feed screw to move the screw axially without rotation between a retracted position and a predetermined extreme forward position,
 (d) a two speed handwheel connected to the feed screw for fast and slow rotation thereof in the nut for movement of the wheelhead on the screw,
 (e) a pulse generator connected to the screw operable to produce pulses proportional in quantity to the angular displacement of the screw and indicative of the direction of rotation of the screw,
 (f) a reversible electronic counter having a readout settable to a reading corresponding to the size of a workpiece ground by the grinding wheel when the wheelhead is in a given position on the screw and the screw is in its extreme forward position, said counter operable in response to pulses received from the pulse generator to change said reading in accordance with the direction and extent of movement of the wheelhead on the screw as the screw is rotated.

3. In a grinding machine, the combination comprising:
 (a) a wheelhead having a rotatable grinding wheel carried thereby and a nut received therein,
 (b) a feed screw threadedly received in said nut,
 (c) a reversible feed motor connected to the feed screw to move the screw axially without rotation between a retracted position and a predetermined extreme forward position,
 (d) a two speed handwheel connected to the feed screw for fast and slow rotation thereof in the nut for movement of the wheelhead on the screw,
 (e) a readout unit having a plurality of sets of digit elements, each set operable to indicate one digit when one element thereof is energized,
 (f) a counting tube for each set of digit elements, each counting tube having a plurality of digit electrodes connected, respectively, to a set of digit elements of the readout unit and each counting tube having two pulse receiving terminals, each counting tube operable in response to a series of pairs or pulses in predetermined sequence at said terminals to successively energize the digit electrodes in a sequence to energize the digit elements of the set in ascending order and operable in response to a series of pairs of pulses in reverse sequence at said terminals to successively energize the digit electrodes in a sequence to energize the digit elements of the set in descending order,
 (g) means selectively to energize a selected electrode of each counting tube for energizing the digit elements in the readout unit to indicate the finished size of a workpiece corresponding to the position of the wheelhead on the screw, (h) means including a pulse generator connected to the feed screw to impress on the terminals of the counting tube connected to the last set of readout digit elements a series of pairs of pulses in predetermined sequence as the screw is rotated to move the wheelhead back on the feed screw and to impress a series of pairs of pulses in reverse sequence when the screw is rotated to move the wheelhead forward on the screw, (i) and means operable when the zero digit electrode of each counting tube except the counting tube connected to the first set of readout digit elements is energized and said wheelhead is being shifted back on the screw to transmit a pair of pulses in predetermined sequence to the terminals of the counting tube connected to the preceding set of readout digit elements and operable when the nine digit electrode of each counting tube except the counting tube connected to the first set of readout digit elements is energized and said wheelhead is being shifted forward on the screw to transmit a pair of pulses in reverse sequence to the terminals of the counting tube connected to the preceding set of readout digit elements.

4. In a machine tool, the combination comprising:
(a) a workpiece supporting member and a forming member,
(b) a feed member operatively connected to one of said members and adjustable relative thereto,
(c) a feed motor operatively connected to said feed member to move the feed member through a predetermined feed cycle and to move said one member towards said other member for forming a workpiece to a size according to the adjusted position of said one member relative to said feed member,
(d) an electrical readout unit settable to read a workpiece size indicating number corresponding to the size of a workpiece formed when said one member is in a given position relative to said feed member,
(e) means to shift said one member relative to said feed member from said given position a selected amount in either direction for forming a workpiece of different size,
(f) and electrical means operable in response to shifting of said one member relative to said feed member to change the reading of the readout unit in accordance with the extent and direction of movement of said one member relative to said feed member to read a different workpiece size indicating number corresponding to said different size.

5. In a grinding machine, the combination comprising:
(a) a feed member,
(b) a feed motor connected to the feed member for movement thereof through a predetermined feed cycle,
(c) a workpiece supporting member and a wheelhead member,
 (1) said wheelhead member having a grinding wheel mounted therein, and
 (2) one of said members mounted on the feed member for movement through a zone towards and away from the other member, said grinding wheel grinding a workpiece on the workpiece supporting member to a diameter depending on the zone of movement of said one member.
(d) an electrical readout unit having a plurality of digit indicators each settable independently of the other digit indicators to read the size of a finished workpiece corresponding to the position of said one member on the feed member,
(e) means to shift said one member in either direction on the feed member to adjust the zone of movement thereof,
(f) and electrical means operatively connected to said one member and responsive to movement thereof on the feed member to change the workpiece size indicating number on the readout unit to correspond to the adjusted position of said one member on the feed member.

6. In a grinding machine, the combination comprising:
(a) a feed member,
(b) means to move the feed member through a predetermined feed cycle,
(c) a workpiece supporting member and a wheelhead member,
 (1) said wheelhead member having a grinding wheel mounted therein, and
 (2) one of said members connected to the feed member,
(d) an electrical readout unit having a plurality of digit indicators each settable independently of the other digit indicators to read the size of a finished workpiece corresponding to the position of said one member on the feed member,
(e) means to shift said one member on the feed member towards and away from said other member, and
(f) means including a counting tube connected to each readout digit to change the digit indicator in accordance with the movement of said one member on the feed member.

7. In a grinding machine, the combination comprising:
(a) a feed member,
(b) means to move the feed member through a predetermined feed cycle,
(c) a workpiece supporting member and a wheelhead member,
 (1) said wheelhead member having a grinding wheel mounted therein, and
 (2) one of said members connected to the feed member,
(d) a readout unit having a plurality of sets of digit elements, each set operable to indicate one digit when one element thereof is energized,
(e) a counting tube for each set of digit elements each counting tube having a plurality of digit electrodes connected, respectively, to the digit elements of the set, said counting tube operable in response to signaling means to successively energize said electrodes in either direction,
(f) means selectively to energize one electrode of each counting tube to energize the digit elements in the readout unit indicating the finished size of a workpiece corresponding to the position of said one member on the feed member,
(g) means to shift said one member on the feed member, and
(h) signaling means responsive to the extent and direction of the shift of said one member on the feed member to keep the reading of the readout unit in correspondence with the position of said one member on the feed member.

8. In a grinding machine, the combination comprising:
(a) a feed member,
(b) means to move the feed member through a predetermined feed cycle,
(c) a workpiece supporting member and a wheelhead member,
 (1) said wheelhead member having a grinding wheel mounted therein, and
 (2) one of said members connected to the feed member,
(d) a readout unit having a plurality of sets of digit elements, each set operable to indicate one digit when one element thereof is energized,
(e) a counting tube for each set of digit elements, each counting tube having a plurality of digit electrodes connected, respectively, to the digit elements of the set and each counting tube having two pulse receiving terminals, each counting tube operable in response to a series of pairs of pulses in predetermined sequence at said terminals to successively energize the digit electrodes in a sequence to energize the digit elements of the set in ascending order and operable in response to a series of pairs of pulses in reverse sequence at said terminals to successively energize the digit electrodes in a sequence to energize the digit elements of the set in descending order, (f) means selectively to energize one electrode of each counting tube to energize the digit elements in the readout unit indicating the finished size of a workpiece corresponding to the position of said one member on the feed member, (g) means to shift said one member on the feed member, and (h) means including a pulse generator operable to produce a series of pairs of pulses in predetermined sequence at said terminals of the counting tube connected to the last set of digit elements in response to movement of said one member relative to said feed member away from the other of said members and operable to produce a series of pairs of pulses in reverse sequence at said terminals in response to movement in the opposite direction of said one member, (j) and means operable when the zero digit electrode of each counting tube except the counting tube connected to the first set of readout digit elements is energized and said one member is being shifted relative to the feed member away from said other member to transmit a pair of pulses in predetermined sequence to said terminals of the counting tube connected to the preceding set of digit elements and operable when the nine digit electrode of each counting tube except the counting tube connected to the first set of readout digit elements is energized and said one member is being shifted relative to the feed member towards said other member to transmit a pair of pulses in reverse sequence to the terminals of the counting tube connected to the preceding set of digit elements.

References Cited by the Examiner
UNITED STATES PATENTS

| | | | |
|---|---|---|---|
| 957,936 | 5/10 | Conradson | 51—165.14 |
| 2,254,002 | 8/41 | Decker et al. | 51—95.1 |
| 2,520,868 | 8/50 | Whiting. | |
| 2,933,858 | 4/60 | Glenn et al. | |

LESTER M. SWINGLE, *Primary Examiner.*